United States Patent [19]

Bates et al.

[11] 4,282,966

[45] Aug. 11, 1981

[54] FEEDING AND ORIENTING DEVICE

[75] Inventors: Erwin F. Bates, Binghamton; Michael D. Snyder, Chenango Bridge, both of N.Y.

[73] Assignee: Universal Instruments Corporation, Binghamton, N.Y.

[21] Appl. No.: 109,873

[22] Filed: Jan. 7, 1980

[51] Int. Cl.³ .............................................. B65G 47/24
[52] U.S. Cl. .................................. 198/382; 198/416; 198/493
[58] Field of Search ............... 198/391, 396, 398, 771, 198/493, 416, 380, 382; 193/38, 41, 44, 47; 221/157, 158, 159, 160

[56] References Cited

U.S. PATENT DOCUMENTS

| 2,725,971 | 12/1955 | Clark-Riede | 198/391 |
| 3,341,031 | 9/1967 | Myers | 193/44 X |
| 4,175,654 | 11/1979 | Lodge | 198/398 |

Primary Examiner—James L. Rowland
Attorney, Agent, or Firm—Fidelman, Wolffe & Waldron

[57] ABSTRACT

A method and apparatus for feeding and orienting parts. The parts are fed in sliding engagement along a guide step and ejected when misoriented. Misoriented parts are either blown off the guide step by an air knife or transversely displaced on the guide step by an ejector that alters their line of travel and causes them to fall off the guide step. All excess and misoriented parts are recirculated for refeeding and orienting.

7 Claims, 14 Drawing Figures

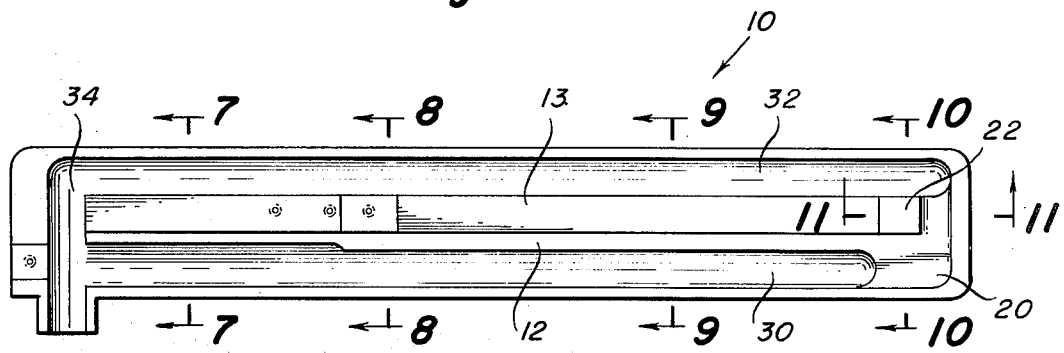
Fig. 4
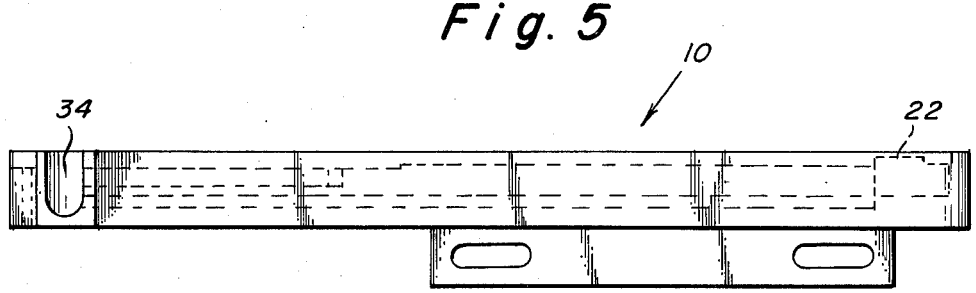
Fig. 5
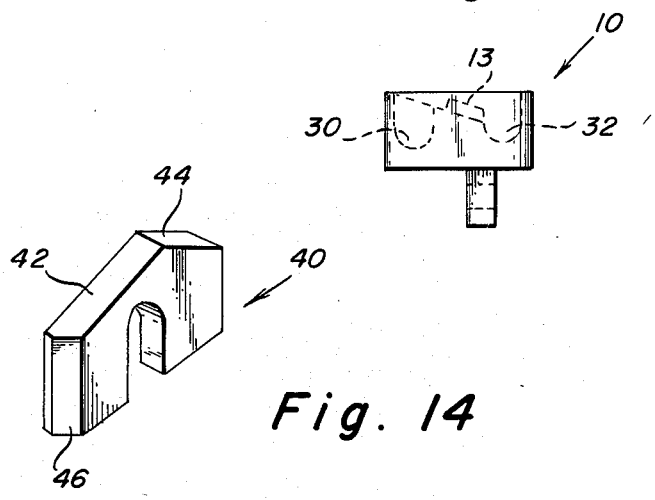
Fig. 6
Fig. 14

FEEDING AND ORIENTING DEVICE

This invention relates to a method and apparatus for feeding and orienting, in a predetermined fashion, parts which are received in a random fashion.

The method and apparatus of the present invention are particularly applicable for feeding and orienting, in a predetermined fashion, electronic components having a rectangular parallelopiped body, but could be used for other articles as well. Miniature capacitors having no leads are typical of this construction and, as will be apparent from the description which follows, the method and apparatus of the invention are particularly applicable for feeding and orienting them, as well as other parts of this general type.

In the past, numerous methods and different types of apparatus have been devised for feeding and orienting parts, particularly electrical components. Many of these prior methods and apparatus are limited in application to one particular type of feeder apparatus, such as a vibratory bowl or linear track section, thereby limiting their versatility and adaptability in application.

It is therefore an object of the present invention to provide an improved method and apparatus for feeding and orienting parts that are received in mass and in random alignment.

It is another object of the present invention to provide apparatus of the above described type which is simply and easily manufactured, and which is adapted to parts of different sizes and shapes.

It is still another object of the present invention to provide apparatus for orienting parts of the above described type which is adaptable to various types of part handling systems.

Additionally, it is an object of this invention to provide apparatus for orienting in a predetermined, consistent fashion those parts which are adaptable to parts handling systems of the gravity feed type, a combination of gravity feed and vibration type, or vibratory parts feeders of either the circular or in-line types, as well as other similar types of systems or conveying means.

Other objects of the invention, in part, will be obvious and will appear hereinafter.

The above outlined objectives are accomplished by means of orienting apparatus which, according to the present invention, generally includes a guide step or guide groove along which parts are fed to an area in which a first ejector is located adjacent to the guide step to alter the line of travel of the parts and to cause ejection from the guide step of parts that are misoriented in one way, and a second (fluid) ejector is located adjacent to the guide step to eject otherwise misoriented parts by impinging fluid onto the parts to blow them from the guide step.

This orienting apparatus is adaptable to virtually any type of parts handling system which is capable of feeding the parts to it in a consistent fashion. In the disclosed embodiment, the apparatus is illustrated in operative relationship with a vibratory linear feeder system, but it is apparent from the description that it is easily adapted to many other types of systems.

The invention accordingly comprises the several steps and the relation of one or more of such steps with respect to each of the others and the apparatus embodying features of construction, combination of elements, and arrangements of parts which are adapted to affect such steps, all as exemplified in the following detailed disclosure; the scope of the invention will be indicated in the claims.

For a fuller understanding of the nature and objects of the invention, reference should be had to the following detailed description taken in connection with the accompanying drawings, in which:

FIG. 4 is a top plan view of the feeder bed without the ejectors and the stop member attached;

FIG. 5 is a front view of the apparatus of FIG. 4;

FIG. 6 is a right side view of FIG. 4;

FIG. 14 is an isometric view of the other ejector.

DETAILED DESCRIPTION OF THE DRAWINGS

One embodiment of the apparatus of the invention, namely a vibrating linear feeder for the electrical component of FIG. 3, now will be described.

Figure 3:
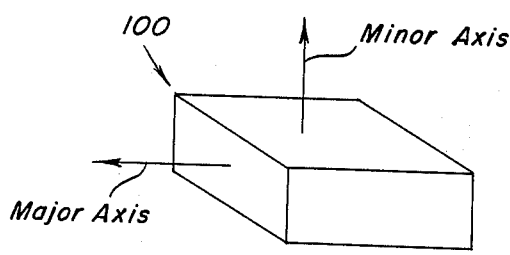
FIG. 3 is an example of one type of part (an electrical component) which may be fed and oriented with the method and apparatus of the instant invention.
Figure 7:
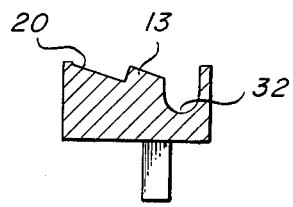
FIG. 7-11 are sectional views corresponding to the section numerals of FIG. 4.
Figure 8:
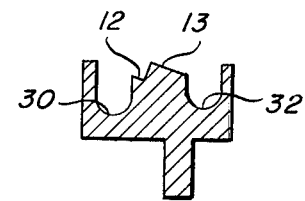

FIG. 3 illustrates an electronic component (lead-less capacitor 100) with perpendicular major and minor reference axes oriented normal to two surfaces of component 100. Of course, for another particular part, these reference axes could be positioned differently.

Figure 2:
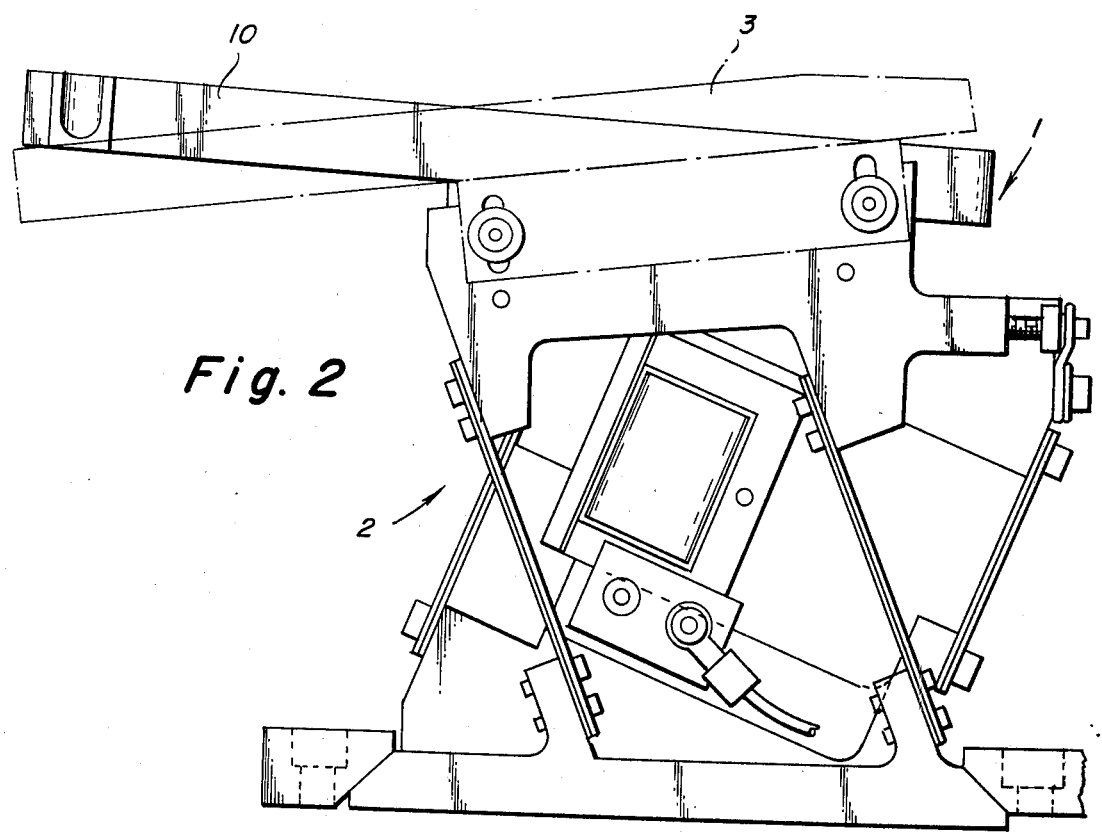
FIG. 2 is a front view of the apparatus of FIG. 1.

In FIG. 2, a vibratory linear feeder apparatus is generally shown at 1. Feeder apparatus 1 includes a vibrator base 2, of the general type known to be old in the art, for supporting and vibrating a feeder bed 10 and a recirculation trough 3.

Figure 1:
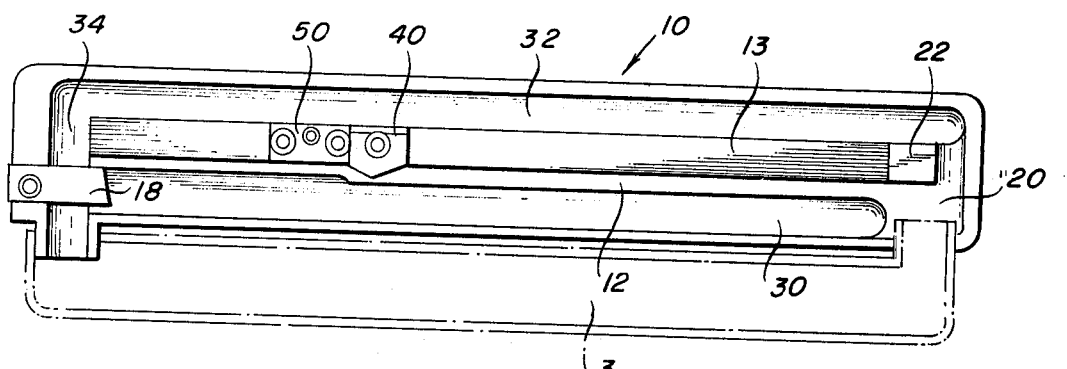
FIG. 1 is a top plan view of the vibratory linear feeder having aligning and orienting apparatus exemplary of the present invention adapted thereto.
Figure 9:
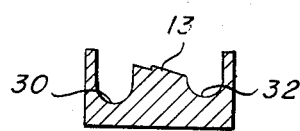
Figure 10:
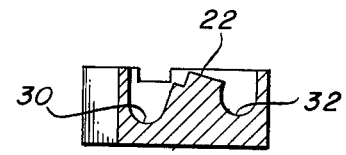
Figure 11:
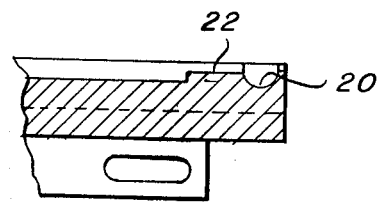
Figure 12:
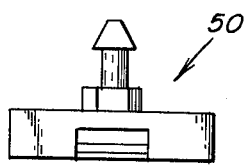
FIG. 12 is a front view of the "air knife" ejector.

Referring to FIG. 1, feeder bed 10 includes a sloping shelf 13 having a guide step 12 along the length of and generally parallel to shelf 13 (Step 12 is best seen in FIG. 9). In the loading area of feed bed 10 is an input step 20 coplanar with guide step 12 and sloped to be parallel to shelf 13. Input step 20 abuts a baffle 22, protruding higher than shelf 12, such that components 100 that are loaded onto input step 20 may slide down the sloping surface of input step 20 until they reach baffle 22. Linear vibration of feeder 1 causes components 100 that are loaded onto input step 20 to slide along guide step 12. According to the number of components 100 that are loaded onto input step 20, there may be more of them than can be handled by the guide step 12. Any excess components 100 will fall into an adjacent return channel 30 or will pass around baffle 22 by one of two alternate routes to a second return channel 32 (as viewed in FIG. 1). The first (rather direct) route is down sloping input step 20, to the right of baffle 22. The second route, for components that ride up too high onto other components that are feeding along guide step 12, is up onto sloping shelf 13, and then down sloping shelf 13 to the left of baffle 22.

The objective is to feed components along guide step 12 to a stop member 18 where they are backed-up in a line for removal from feeder 1 (by some means not shown), while removing misoriented components from the line of feed by means of a first ejector 40 and a second ejector 50. Due to the linear vibration of feeder 1 and the sloping configuration of guide step 12, this feeding of components is accomplished.

First ejector 40 has angled surfaces 42, 44 to alter the line of travel of the components on guide step 12. Guide step 12 is wide enough for some components that engage ejector 40 at surface 42 to be diverted transversely on guide step 12 around angled surfaces 42, 44, while still remaining on guide step 12. However, those components that have their major axis yaw-misoriented with respect to the proper line of travel will become unbalanced on guide step 12 by this transverse diversion and will fall into return channel 30. Also, if two components have traveled abreast along guide step 12, the one nearest to return channel 30 will fall from guide step 12 when their line of travel is altered by ejector 40.

Ejector 40 also has a ramp 46 to provide a smooth transition between shelf 13 and ejector 40. Without ramp 46 and according to the slope of shelf 13, some components were found to abut ejector 40 and to interfere with the components on step 12. By providing ramp 46, this interference is prevented and components on shelf 13 ride up ramp 46 and fall into return channel 32. Ejector 40 serves the additional function of relieving the pressure on the first component, that engages stop member 18, by subsequent backed-up components. Any back-up of components is limited by angled surface 44, the extra components falling into return channel 30. If angled surface 44 were not provided, the pressure on the first component by subsequent components could cause misorientation of one or more of the subsequent components as the first component is removed from feeder bed 10 at stop 18. Of course, the spacing of ejector 40 from stop 18 depends upon the type and size of the parts being handled.

Figure 13:
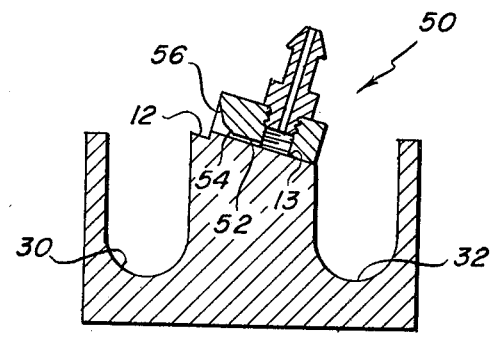
FIG. 13 is an enlarged sectional view of the "air knife" ejector mounted on the shelf.

Second ejector 50 is located adjacent to guide step 12 and to the left of ejector 40 as viewed in FIG. 1. Of course, ejector 50 could be located to the right of ejector 40 or could even be incorporated into one structure with ejector 40. The purpose of ejector 50 is to eject those components that are misoriented by having their minor axis rolled out of a required orientation (i.e. in this embodiment, the required orientation of the minor axis of components 100 is normal to the plane of guide step 12), or those that are misoriented by having their major axis pitched relative to the line of travel. All components that are not misoriented in these ways are unaffected by ejector 50. The ejection of a misoriented part is by contact of an "air knife" with the component. As best seen in FIG. 13, "air knife" ejector 50 is mounted on shelf 13 adjacent to guide step 12 and may be adjusted in height on shelf 13 by shims or the like. The so-called "wall effect" or "Coanda effect" is used to ensure selective ejection of components. Ejector 50 has a knife blade-like flow of air emitting from slot 52. By providing angled flats 54, 56, the air exitting slot 52 is caused to follow flats 54, 56 and to be directed generally upwardly by the "Coanda effect". This ensures that the air flow does not follow the surface of shelf 13 to guide step 12 sufficiently to blow properly oriented components off of guide step 12, but that improperly oriented components are blown off of guide step 12. Of course, angled flats 54, 56 could be replaced by an arcuate surface; the flats 54, 56 have been used to facilitate machining operations.

Return channels 30, 32 feed into return channel 34 which, in turn, feeds into recycling trough 3 for recycling components to input step 20 of feed bed 10.

One prototype of this embodiment, which has yielded excellent results, includes a 60 Hz (120 vibrations per second) vibrator motor, with shelf 13 angled at approximately 16° to horizontal.

Since certain changes may be made in carrying out the above method and in the construction set forth, without departing from the scope of the invention, it is intended that all matter contained in the above description or shown in the accompanying drawings shall be interpreted as illustrative and not in a limited sense.

It is also to be understood that the following claims are intended to cover all of the generic and specific features of the invention herein described and all statements of the scope of the invention which, as a matter of language, might be said to fall therebetween.

Having described the invention, what is claimed as new and is desired to be secured as letters patent is:

1. An apparatus having a guide means and adapted for feeding and orienting parts, each of said parts having a body which may be described in orientation relative to a line of travel along said guide means by a major reference axis and a minor reference axis perpendicular to and intersecting said major reference axis, such that said body is properly oriented when conditions are met that said major reference axis is tangent to a point of said line of travel and said minor reference axis is in a required angular orientation about said line of travel at said point and said body is misoriented when said conditions are not met, comprising:
   a first ejection means adjacent to said guide means for ejecting parts that are misoriented in one way, with said major reference axis yawed relative to said line of travel, by causing transverse displacement of said parts relative to said guide means, whereby said parts misoriented in one way are caused to become unbalanced and to fall from said guide means;
   a second ejection means adjacent to said guide means, for ejecting parts that are otherwise misoriented, with said major reference axis pitched or said minor reference axis rolled out of said required orientation relative to said line of travel, said second ejection means located to emit fluid onto said otherwise misoriented parts to blow them from said guide means and not to blow properly oriented parts from said guide means.

2. An apparatus as in claim 1, further comprising: a lateral sloping shelf, said guide means located along the length of said shelf and adapted to prevent lateral sliding of said parts down said shelf as they are fed along said guide means.

3. An apparatus as in claim 2, wherein said guide means comprises a laterally sloping step parallel to and lower than said shelf at the high side of the lateral slope of said shelf, whereby said parts are retained on said step by gravity as they are fed along said guide means.

4. An apparatus as in claim 3, wherein
   said shelf has a wide portion and a narrow portion;
   said first ejection means is located on top of said shelf and extends outwardly over said wide portion of said step into the line of travel of said parts to alter the line of travel of said parts along said shelf;
   whereby said parts misoriented in said one way are caused to become unbalanced relative to said shelf and to fall off of said shelf, parts not misoriented in said one way following an altered line of travel around said first ejection means and passing onto said narrow portion of said shelf as they are fed along said shelf.

5. An apparatus as in claim 4, further comprising a stop means adjacent to said narrow portion of said shelf and adapted to contact a first part fed along said shelf to halt the feed of said part and subsequent parts as they back up along said shelf, said first ejector means adapted to relieve the pressure on said first part by said subsequent parts, whereby removal of said first part does not cause misorientation of said subsequent parts by frictional engagement with an adjacent part.

6. An apparatus as in claim 4, wherein said first ejection means includes a transition means for preventing parts on said shelf from abutting with said first ejection means and interfering with the parts on said step, whereby any parts on said shelf that reach said first ejection means follow said transition means and are prevented from interfering with parts on said step.

7. An apparatus as in claim 1, wherein said second ejector comprises a Coanda effect air nozzle, whereby said emitting fluid is guided away from said shelf and said guide means so that properly oriented parts are not blown off of said guide means.

* * * * *